Jan. 31, 1956 C. A. CHAYNE 2,732,903
WHEEL SUSPENSION COMPRISING SECTIONAL DEAD AXLE
AND CONNECTIONS THEREFROM TO VEHICLE FRAME
Filed Feb. 17, 1951 5 Sheets-Sheet 4

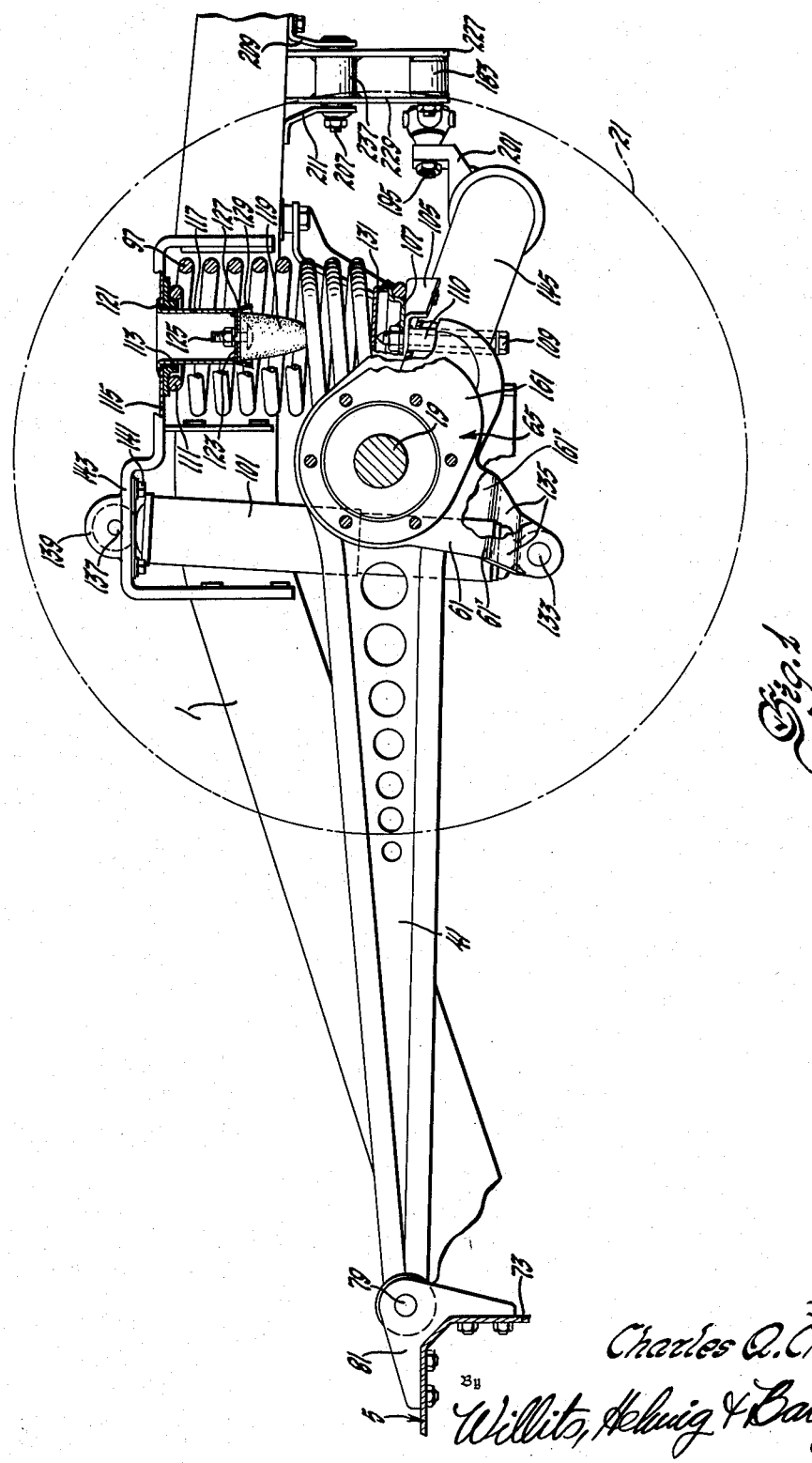

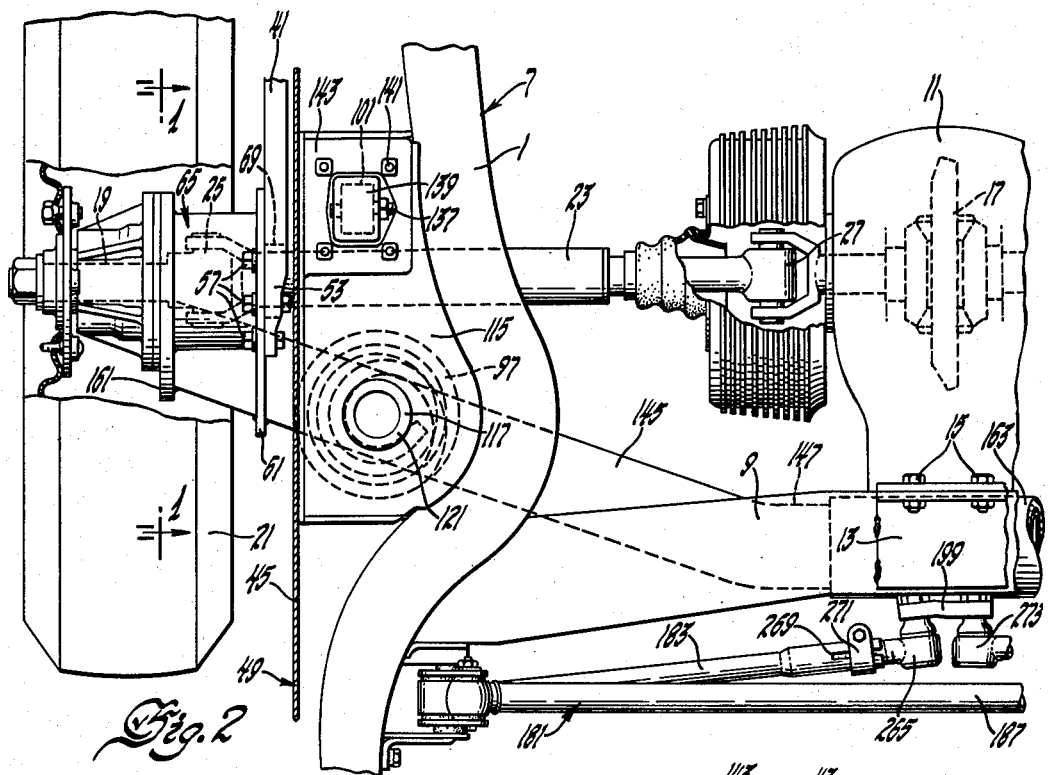

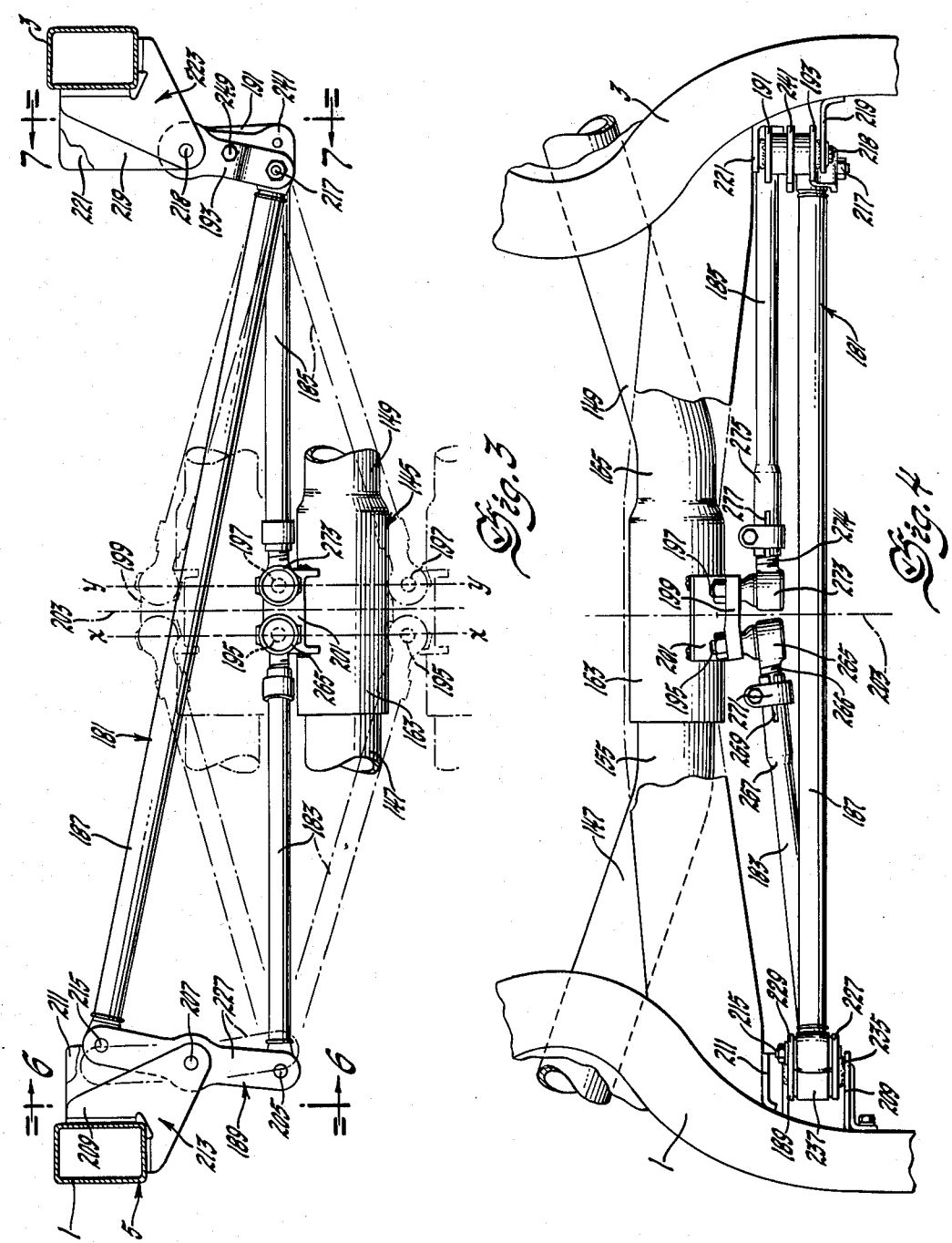

Inventor
Charles A. Chayne
By Willits, Helwig & Baillio
Attorneys

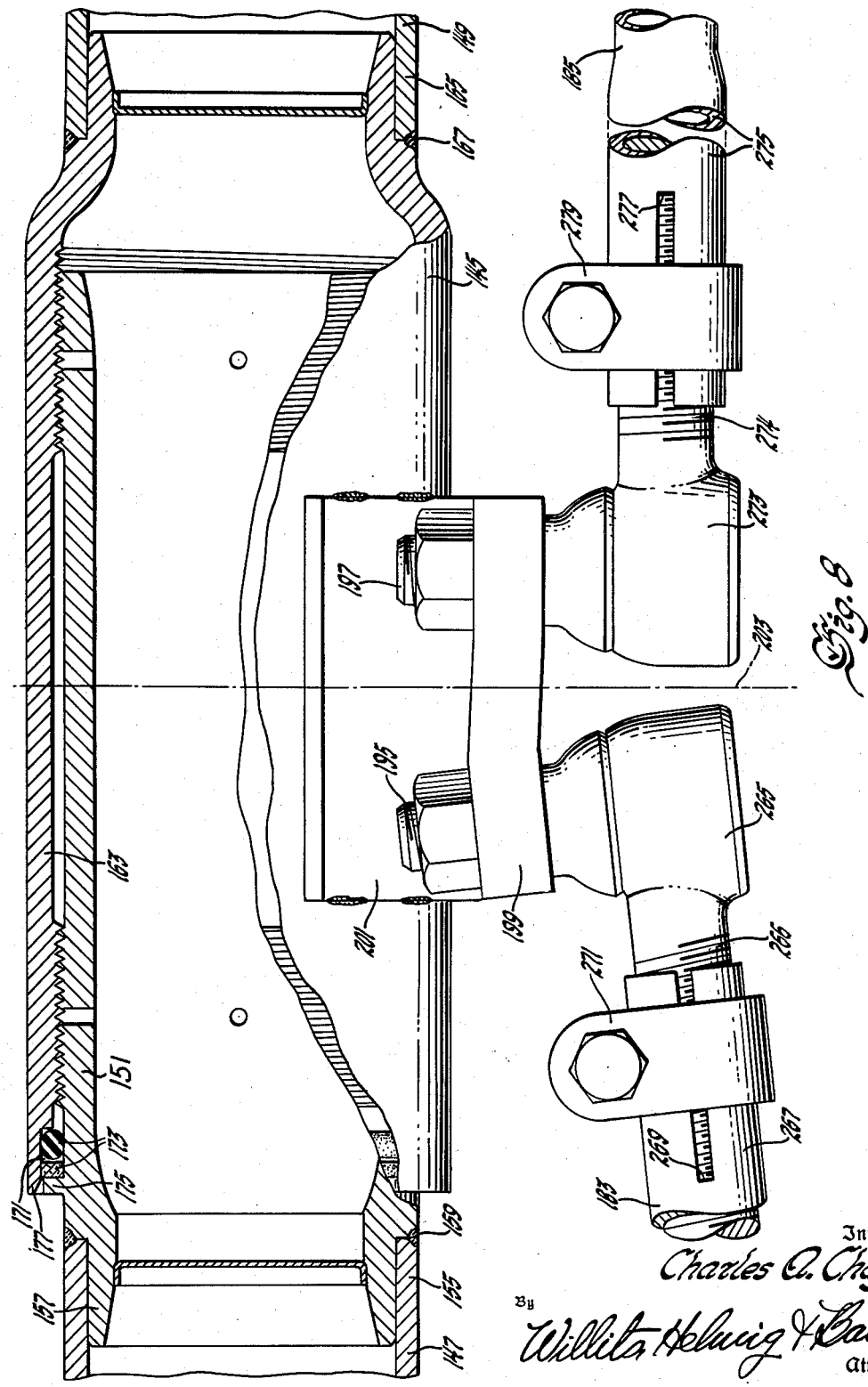

United States Patent Office 2,732,903
Patented Jan. 31, 1956

2,732,903

WHEEL SUSPENSION COMPRISING SECTIONAL DEAD AXLE AND CONNECTIONS THEREFROM TO VEHICLE FRAME

Charles A. Chayne, Detroit, Mich., assignor to General Motors Corporation, Detroit, Mich., a corporation of Delaware Application February 17, 1951, Serial No. 211,476

4 Claims. (Cl. 180—73)

This invention relates to flexible, resilient suspensions and more particularly to flexible, resilient rear suspensions for motor vehicles.

One object of the present invention is to provide a suspension which assures the optimum of resiliency, flexibility, safety and serviceability.

Another object is to provide a rear suspension for motor vehicles which is compact and simple in construction and which greatly improves the ride qualities of such vehicles over suspensions employed heretofore.

A further object is to provide in devices of the stated character, a sectional dead axle between the rear wheels of a motor vehicle, the said sections being relatively movable with respect to each other thereby eliminating torsional strains which occur in rigid axles especially when a vehicle is operated over bumpy or otherwise uneven roads.

A still further object is to provide a shiftable mechanism for connecting the rear axle of the vehicle to the frame thereof which compels the axle to rise and fall in substantially a vertical plane with substantially no lateral displacement with respect to the longitudinal center line of the vehicle.

A still further object is to provide connecting means which enables the lateral stiffness between the rear axle and the frame of a motor vehicle to be controlled. By controlling the lateral stiffness between the axle and frame the lateral frequency of vibration of the axle with respect to the frame may be tuned so as to produce the most desirable conditions of operation.

A more specific object is to provide a rear suspension for motor vehicles including an adjustable, interconnected arrangement of links and levers for connecting the rear axle of the said vehicle to the frame thereof which enables adjustment of the vehicle to different predetermined roll center heights.

Other and further objects will become apparent as the description of the invention progresses.

Of the drawings—

Fig. 1 is a side elevational view of the rear suspension comprising the present invention, taken along line 1—1 of Fig. 2, portions of the vehicle being removed to more clearly show certain of the elements thereof.

Fig. 2 is a plan view of the portion of the rear suspension shown in Fig. 1 extending to the left of the longitudinal center line of the vehicle.

Fig. 2a is a plan view of the portion of the rear suspension shown in Fig. 1 extending to the right of the longitudinal center line of the vehicle.

Fig. 3 is an end elevational view looking toward the front of a vehicle showing the interconnected arrangement of links and levers for connecting the rear dead axle thereof to the frame.

Fig. 4 is a plan view of the structure shown in Fig. 3.

Fig. 8 is a plan view partly in section of the central portion of the dead axle assembly.

Figure 5:
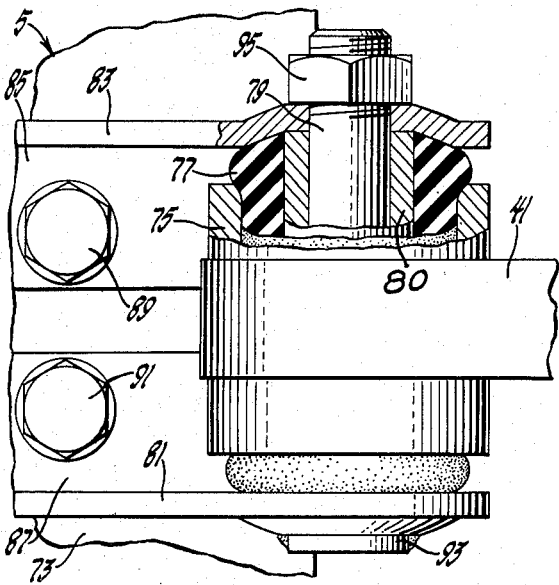
Fig. 5 is a plan view, partly in section, of the pivotal mounting for the inner end of one of the vehicle driving arms.

Referring to the drawings, 1 and 3 indicate the left and right rear side rails, respectively, of the frame 5 of a motor vehicle indicated generally at 7. Welded or otherwise secured to side rails 1 and 3, intermediate the ends of the latter, is a supporting cross member 9. The differential gear housing 11, associated with the driving mechanism of the vehicle, is secured to a supporting bracket 13 mounted on cross member 9 by bolts 15 or by any other suitable means.

The differential gearing 17 mounted within housing 11 is operatively connected to the live or drive axle 19 of left rear wheel 21 by a shaft 23, universal coonections 25 and 27 being provided between said axle and shaft and between said shaft and the differential gearing, respectively, to permit the said wheel to rise and fall relative to the said differential gearing and housing. Differential gearing 17 is likewise operatively connected to the live or drive axle 29 of right rear wheel 31 by a shaft 33, universal connections 35 and 37 also being provided between the drive axle and said shaft and between said shaft and the differential gearing, respectively, to permit the said wheel to rise and fall relative to the said differential gearing and its housing 11.

Except to the extent described herein, the specific structure of the driving mechanism for the vehicle including the differential gearing forms no part of the present invention and accordingly a detailed description thereof will not be given herein.

Referring more particularly to Figs. 1, 2 and 2a, it will be observed that the driving thrust of rear wheels 21 and 31 is imparted to the vehicle by a pair of longitudinally extending driving arms 41 and 43. Driving arms 41 and 43 are disposed adjacent to the inner walls 45 and 47 of the wheel housings 49 and 51, respectively, and the enlarged ends 53 and 55 thereof are secured by bolts 57 and 59, or other suitable fastening means, to the inner flanges 61 and 63 of axle housings 65 and 67. The enlarged ends 53 and 55 of driving arms 41 and 43 are provided, respectively, with enlarged openings 69 and 71 extending transversely therethrough through which drive shafts 23 and 33 extend.

The inner ends of driving arms 41 and 43 are pivotally mounted in brackets secured to the center cross member 73 of the vehicle frame 5. Inasmuch as the pivotal mounting for the inner end of each driving arm is identical, a description of one will suffice for both. As shown in Figs. 1 and 5 the inner concave end of driving arm 41 has welded or otherwise secured thereto a hollow cylindrical bearing element 75. A relatively thick bushing 77, constructed of any suitable resilient shock absorbing material, such as rubber, is tightly fitted into element 75. A bearing bushing 80 journalled on a bolt 79 extends through and intimately engages the inner surface of bushing 77. Bolt 79 extends through aligned openings provided in the vertical flanges 81 and 83, respectively, of a pair of spaced substantially L-shaped brackets 85 and 87 secured by bolts 89 and 91 to center cross frame member 73. The head end 93 of bolt 79 is secured to flange 81 by welding or by any other suitable means. A nut 95 screwed onto the other threaded end of the bolt retains the parts in the position shown in Fig. 5. Upon reference to Fig. 5, it will be observed that bulges occur in bushing 77 between the ends of bearing element 75 and the flanges 81 and 83. By this construction bushing 77 cushions the lateral as well as longitudinal thrusts imposed on the vehicle by the driving arms.

From the foregoing description it is evident that the driving force of wheels 21 and 31 is imparted to the vehicle through the driving arms 41 and 43. It is also clear that by virtue of the pivotal mountings for the inner ends of driving arms 41 and 43, either or both of wheels 21 and 31 may rise or fall independently of the vehicle frame.

As shown more clearly in Figs. 1, 2 and 2a, the rear suspension includes a pair of coil springs 97 and 99 disposed at opposite sides of the vehicle. A pair of shock absorbers 101 and 103 mounted at opposite sides of the vehicle also comprise a portion of the rear suspension for said vehicle. Since the structure of and mountings for the spring and shock absorber at each side of the vehicle is the same, a more or less detailed description of the spring and shock absorber at the left side of the vehicle, only, will be given herein.

Welded or otherwise secured to the upper surface of a sectional tubular axle 145 is a supporting bracket or seat 105 for the lower end of coil spring 97. Spring 97 is retained on seat 105 by means of retaining member 107 which is drawn tightly into engagement with the lowermost convolution of said spring by a bolt 109. Bolt 109 extends through a sleeve 110 and through openings in spring seat 105 and retaining member 107. Sleeve 110 is mounted in aligned openings in axle 145 and is secured to the latter by welding. The periphery of the retaining member is shaped so as to conform with the curvature of the spring. The spring 97 is thus firmly held on its seat 105. The upper reduced end 111 of spring 97 engages a spring seat 113 secured to the under side of an extended supporting bracket 115 welded or otherwise secured to side rail 1. Fitted in an aperture in bracket 115 in alignment with spring 97 is a tubular support 117 for a relatively large conical shaped bumper 119. The upper end 121 of support 117 is spun over the edge of the opening and is secured to the upper surface of bracket 115 by welding. A circular plate 123 having an opening centrally thereof is welded to the lower end of support 117. A bolt 125 having its head embedded in bumper 119 secures the latter to support 117. A spacer member 127 having a downwardly extending annular flange 129 thereon is provided between bumper 119 and the circular plate 123 at the lower end of support 117. The lower end of bumper 119 is adapted to strike the upper surface of an inverted cup-shaped member 131, welded to spring retaining member 107, when the spring 97 has been compressed to its maximum permissible extent.

Shock absorber 101 is pivotally supported at its lower end on a bolt 133 mounted in a supporting bracket 135. Bracket 135 may consist of downwardly and forwardly inclined extensions 61' and 161' of flanges 61 and 161 of axle housing 65, or of separate members welded to the said housing. The upper end of shock absorber 101 is pivotally supported on a bolt 137 mounted in an elevated support 129 secured by bolts 141 to the upper extended end 143 of bracket 115.

The axle housings 65 and 67 and consequently the associated rear wheels 21 and 31 are effectively held in properly spaced relation by dead or supporting axle member 145. Axle member 145 is constructed in two sections 147 and 149 which are so connected as to permit independent turning or rotary movement thereof and thereby eliminate torsional strains which usually occur in rigid axles. As shown more particularly in Figs. 2, 2a and 8, axle section 147 comprises an externally threaded relatively straight tubular portion 151 and a slightly curved tubular portion 155. Tubular portion 151 terminates at the left hand end thereof in a reduced portion 157 which receives the inner or right hand end of tubular portion 155. When the parts have been thus assembled and properly aligned they are secured together by welding as shown at 159. The outer end of tubular portion 155 extends through an opening in flange 61 of axle housing 65 and is secured to said flange and to a second flange 161 of said housing, as well as to the housing proper, by welding.

Axle section 149 comprises a relatively straight internally threaded portion 163 and a slightly curved portion 165 generally similar to portion 155 of section 147. The reduced right hand end of portion 163 is fitted into the left hand end of tubular portion 165 and when the parts are properly aligned they are secured together by welding as shown at 167. The right hand end of tubular portion 165 extends through an opening in flange 63 of axle housing 67 and is welded to said flange, and also to the housing proper, and to a second flange 169 of said housing.

In assembling axle 145, straight portions 151 and 163 are first brought into threaded engagement with each other until they assume the position shown in Figs. 1 and 8. Portions 155 and 165 are then properly assembled on their associated axle housings and on the reduced ends of their respective threaded portions as hereinbefore described before the parts are welded together. It will be observed that the internal diameter of straight portion 163 is slightly greater at the left hand end thereof which, when the parts are assembled, provides an annular recess 171 for receiving sealing means 173 to prevent moisture or other foreign matter from coming into contact with the contacting portions thereof. An annular shoulder 175 provided on straight portion 151 cooperates with the enlarged end 177 of straight portion 163 to retain the sealing means 173 in position.

The sectional construction of axle 145 permits either of the sections thereof to rotate slightly independently of the other section in case either of the rear wheels of the vehicle should rise or fall. Torsional strains which occur at such times in connection with stiff, rigid axles are thus substantially eliminated in axle 145.

Figure 7:
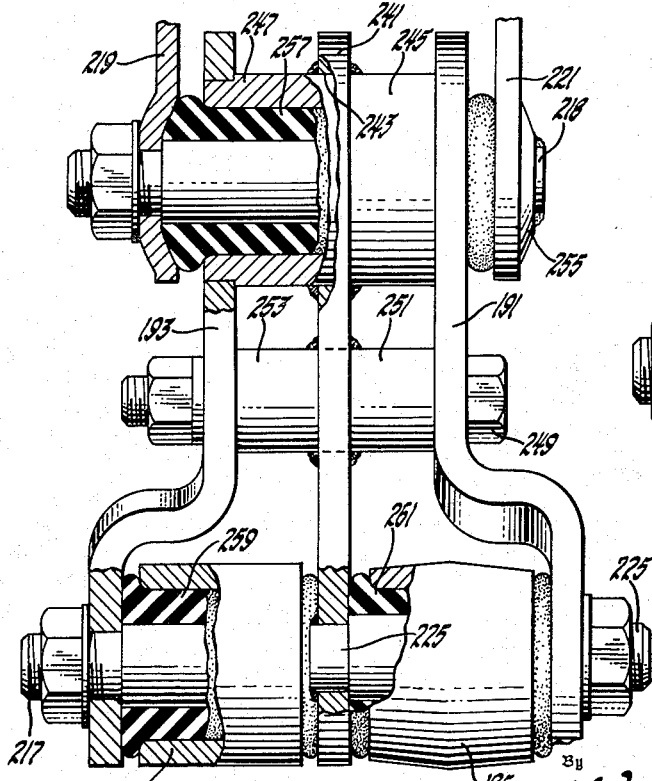
Fig. 7 is an end view taken substantially along line 7—7 of Fig. 3.

The rear suspension also includes a shiftable mechanism which connects the axle 145 to the frame 5 in such a manner that said axle is compelled to rise and fall in substantially a vertical plane and with substantially no displacement laterally of the vehicle. Referring more particularly to Figs. 3 and 4, the shiftable mechanism is indicated generally by numeral 181 and includes a pair of radius rods 183 and 185, a tie rod 187, a two-arm lever 189 mounted on side rail 1 and a second two-arm lever, comprising depending arms 191 and 193, mounted on side rail 3. The inner ends of radius rods 183 and 185 are pivotally connected to supporting pins or bolts 195 and 197, respectively, secured to the vertical flange 199 of a bracket 201 which in turn is secured by welding or other suitable means to the straight portion 163 of dead axle 145. The supporting bolts 195 and 197 are disposed on opposite sides of the longitudinal center line 203 of the vehicle in slightly spaced relation as shown in Fig. 3. The outer end of radius rod 183 is mounted for pivotal movement on a pin or bolt 205 secured to the lower end of lever 189. Lever 189 is pivotally supported intermediate its ends on a pin or bolt 207 secured to the spaced walls 209 and 211 of a bracket 213 welded or otherwise secured to rear side rail 1. The upper end of lever 189 has secured thereto a pin or bolt 215 on which one end of tie rod 187 is pivotally supported. As shown in Figs. 3, 4, and 7 the other end of tie rod 187 is pivotally supported on a pin 217 secured to the lower end of depending arm 193 pivotally supported, with depending arm 191, on a pin 218 secured in aligned apertures provided in the spaced side walls 219 and 221 of a bracket 223 welded or otherwise secured to rear side rail 3 of the vehicle frame 5. The outer end of radius rod 185 is pivotally supported on a pin 225 which in turn is secured to the lower end of arm 191.

Figure 6:
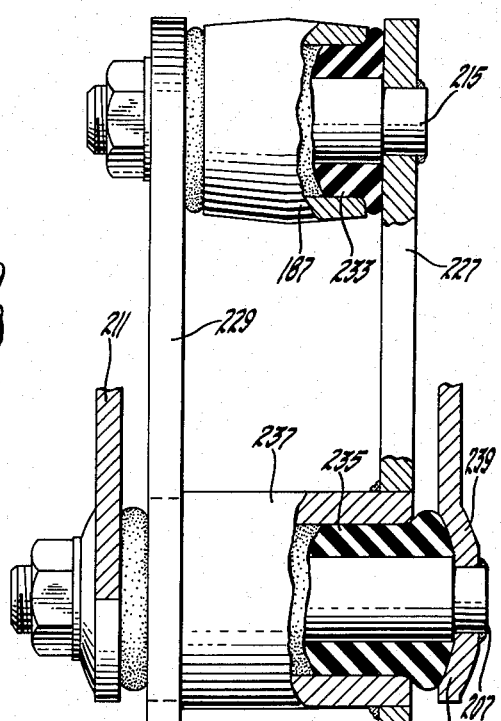
Fig. 6 is an end view taken substantially along line 6—6 of Fig. 3.

As shown in Fig. 6, lever 189 comprises a pair of spaced parallel bars 227 and 229. Pins 205 and 215 are secured to bar 227 by welding, and nuts provided on the opposite threaded ends draw the parts into the position shown in Fig. 6. Heavy flexible bushings 231 and 233 are provided on pins 205 and 215, respectively, to cushion the action of radius rod 183 and tie rod 187. A heavy flexible bushing 235 is also provided on pin 207 forming a cushioning shock absorbing element between said pin and the cylindrical bearing element 237 secured to bar 227. Bearing element 237 is secured to bar 227 by welding or other suitable means in concentric relation with pin 207. A head portion 239 is welded to one end of pin 207 and a nut secured to the other threaded end, when tightened, draws the parts to the position shown in Fig. 6.

Arms 191 and 193, to which radius rod 185 and tie rod 187 are pivotally connected, are disposed at an angle to each other as shown in Fig. 3. A flat bar 241 is disposed in spaced relation with arms 191 and 193 and forms therewith the supports for pins 225 and 217. Bar 241 is provided with an enlarged aperture 243 near its upper end and has welded on either side thereof, in concentric relation with said aperture, a pair of cylindrical bearing elements 245 and 247. A tie bolt 249 extends through aligned apertures provided in arms 191 and 193 and bar 241, intermediate the ends thereof, and also through a pair of spacer elements 251 and 253, the latter being welded to the opposite sides of the said bar 241. The inner ends of pins 217 and 225 enter openings provided near the lower end of bar 241 and are welded, respectively, to the opposite sides of said bar as shown in Fig. 7. The lower ends of arms 191 and 193 are bent outwardly and downwardly in order to accommodate the ends of radius rod 185 and tie rod 187, respectively. Nuts provided on the outer threaded ends of bolts 217 and 225 draw the lower ends of arms 191 and 193 toward bar 241 to the position shown in Fig. 7.

A head portion 255 is welded or otherwise secured to one end of bolt 218, which in assembly, bears against wall 221 of bracket 223. A nut is provided on the other threaded end of pin 218 which when tightened draws the upper end of the assembly to the position shown in Fig. 7, the bearing elements 245 and 247 functioning also as spacer elements for arms 191 and 193. A heavy resilient bushing 257 is mounted on pin 218 thereby forming a resilient shock absorbing support for the arms 191 and 193. Heavy resilient bushings 259 and 261 are provided on pins 217 and 225 to cushion and absorb the shock due to the action of tie rod 187 and radius rod 185, respectively.

Referring to Fig. 4, it will be seen that radius rods 183 and 185 are of sectional construction to provide for longitudinal adjustment. Rod 183 comprises an inner section which, as hereinbefore described, is pivotally supported on the pin or bolt 195. Section 265 has an externally threaded portion 266 which extends into and makes threaded engagement with the inner tubular end of outer section 267. Outer section 267 is provided with longitudinal slits 269 near the inner end thereof so that it may be brought into locking engagement with the inner section when pressure is exerted thereon by a clamp 271. Radius rod 185 is likewise comprised of an inner section 273 having a threaded portion 274 which extends into and makes threaded engagement with the tubular inner end of outer section 275. The inner end of outer section 275 is also provided with longitudinally extending slits 277 so that the sections may be drawn tightly into locking contact with each other when pressure is brought thereon by a clamp 279. Thus when the radius rods 183 and 185 are assembled the sections thereof are first properly adjusted longitudinally, as just described, and then locked in adjusted position by clamps 271 and 279 or by any other suitable means.

As shown in Fig. 3, the broken lines indicate the uppermost and lowermost positions of radius rods 183 and 185 and of the bolts or pins 195 and 197, respectively, pivotally attaching the said rods to axle 145. It will be observed that the connecting mechanism 181 just described compels the bolts 195 and 197 and consequently points on axle 145 to travel in a vertical plane, as indicated by lines $x$ and $y$ disposed on opposite sides of center line 203, during the entire range of movement of the said axle from its lowermost position to its uppermost position. It will also be observed that no axial movement of the axle 145 or movement thereof laterally of the vehicle occurs during movement of said axle between its upper and lower limits of travel. The lateral thrust resulting from vertical tilting of the axle 145 is taken up by the frame 5 rather than by the wheels and axle of the vehicle.

By providing adjustable radius rods it is seen that proper positioning of the various parts not only may be readily made but that the height of the roll center of the vehicle might also be adjusted to the most desirable elevation. It is also believed to be apparent that the lateral stiffness between the rear axle and the frame may be readily controlled by properly proportioning the size and resiliency of the various elements of the shiftable connecting mechanism 181 and their mountings.

From the foregoing description it is believed to be apparent that a highly flexible, resilient suspension has been provided which not only improves the ride qualities of the vehicle but also assures the utmost safety and longevity of service.

While a single embodiment of the invention has been shown and described herein it is apparent to those skilled in the art that changes may be made therein and further modifications employed, if desired, without departing from the invention. It, therefore, is to be understood that it is not intended to limit the invention to the embodiment shown and described herein but only by the scope of the claims which follow.

What is claimed is:

1. In a suspension for motor vehicles, the combination of a frame, including a pair of spaced side rails and a cross member rigidly connected to said side rails, a pair of road wheels disposed outwardly of said side rails, a pair of drive axles, one axle being operatively connected to each of said wheels, flexible driving means operatively connected to said axles for driving said wheels, a housing for each of said axles, a driving arm pivotally connecting each of said housings with said cross member, a sectional supporting axle rigidly connected to each of said wheel housings for holding the latter in properly spaced relation, means providing a pivotal joint between said sections whereby either of said sections may freely turn about its axis relative to the other section when subjected to torsional forces imposed by said wheels and housings, and means connecting said axle to said side rails, said last mentioned means including means for compelling said supporting axle to move in a vertical plane, when tilted vertically in either direction with substantially no axial displacement.

2. In a suspension for motor vehicles, the combination of a frame, including a pair of spaced side rails and a cross member rigidly connected to said side rails, a pair of road wheels disposed at opposite sides of said frame, a pair of drive axles, one axle being operatively connected to each of said wheels, flexible driving means operatively connected to said axles for driving said wheels, a pair of widely spaced axle housings, one for each of said axles, a driving arm pivotally connecting each of said housings with said cross member, a sectional axle rigidly connected to each of said housings for holding the latter in properly spaced relation, means providing a pivotal connection between said sections whereby either of said wheel housings may rise or fall without subjecting said axle to torsional strain, and means including a series of interconnected links and levers connecting said axle to said side rails whereby any tilting movement imparted to said axle by said wheels and housings is directed in a vertical plane and with substantially no axial displacement of said axle.

3. In a vehicle suspension, a vehicle frame, a pair of road wheels disposed at opposite sides of said frame, a pair of driving axles, one for each of said wheels, driving means for said wheels including differential gearing, a housing for said differential gearing secured to said frame, a pair of drive shafts, one of said shafts connecting one side of said differential gearing to one of said axles and the other of said shafts connecting the other side of said differential gearing to the other of said axles, universal connections between said shafts and said axles and between said shafts and said differential gearing whereby either of said wheels may rise or fall relative to said differential gearing during operation of said driving mechanism, shafts and axles, a housing for each of said axles, a pair of driving arms operatively connecting said housings to said frame, a sectional supporting axle secured to said housings for holding them in properly spaced relation, flexible means interconnecting the sections of said supporting axle whereby either section may turn about its axis relative to the other section when subjected to torsional stress, and means connecting said axle to said frame, said last mentioned means including means for preventing axial displacement of said axle when either end thereof is raised or lowered relative to said frame.

4. In a suspension for vehicles, the combination of a frame, a sectional wheel supporting axle disposed beneath and in spaced relation with said frame, connecting means provided on the said sections of said axle permitting either of said sections to turn on its axis relative to the other section when subjected to torsional stress, and means connecting said axle to said frame, said last mentioned means including means for preventing axial displacement of said axle when either end thereof is raised or lowered relative to said frame.

References Cited in the file of this patent
UNITED STATES PATENTS

| | | |
|---|---|---|
| 1,570,210 | De Coninck | Jan. 19, 1926 |
| 1,985,145 | Bugatti | Dec. 18, 1934 |
| 2,012,202 | Pavlack | Aug. 20, 1935 |
| 2,074,289 | Wagner | Mar. 16, 1937 |
| 2,159,859 | Nickelsen | May 23, 1939 |
| 2,163,981 | Lawrence | June 27, 1939 |
| 2,173,667 | Slack | Sept. 19, 1939 |
| 2,182,248 | Chayne | Dec. 5, 1939 |
| 2,219,828 | Steinmann | Oct. 29, 1940 |
| 2,285,954 | Wahlberg | June 9, 1942 |
| 2,344,380 | Wilfert et al. | Mar. 14, 1944 |
| 2,345,448 | Best | Mar. 28, 1944 |
| 2,367,817 | Brown | Jan. 23, 1945 |
| 2,509,803 | Booth | May 30, 1950 |

FOREIGN PATENTS

| | | |
|---|---|---|
| 602,509 | France | Mar. 20, 1926 |
| 493,412 | Great Britain | Oct. 7, 1938 |
| 619,127 | Great Britain | Mar. 4, 1949 |